United States Patent
Tsukishima et al.

(10) Patent No.: US 8,462,617 B2
(45) Date of Patent: Jun. 11, 2013

(54) METHOD FOR RELIEVING FAILURE, AND PACKET COMMUNICATION DEVICE

(75) Inventors: Yukio Tsukishima, Yokohama (JP); Naohide Nagatsu, Tokyo (JP); Atsushi Watanabe, Yokosuka (JP); Akira Hirano, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 18 days.

(21) Appl. No.: 11/665,303

(22) PCT Filed: Sep. 19, 2006

(86) PCT No.: PCT/JP2006/018500
§ 371 (c)(1),
(2), (4) Date: Apr. 12, 2007

(87) PCT Pub. No.: WO2007/066442
PCT Pub. Date: Jun. 14, 2007

(65) Prior Publication Data
US 2009/0028043 A1    Jan. 29, 2009

(30) Foreign Application Priority Data

Dec. 5, 2005  (JP) .................................. 2005-350602

(51) Int. Cl.
*G01R 31/08*  (2006.01)
(52) U.S. Cl.
USPC ............ 370/216; 370/217; 370/218; 370/225
(58) Field of Classification Search
USPC ................. 370/216–218, 223, 228, 237, 238, 370/255–258, 295, 351, 352, 355, 392, 395.1, 370/396–404; 709/223, 239
See application file for complete search history.

(56) References Cited

U.S. PATENT DOCUMENTS 5,862,125 A * 1/1999 Russ ............................. 370/228
5,930,259 A * 7/1999 Katsube et al. ............... 370/409

(Continued)

FOREIGN PATENT DOCUMENTS

JP  2002-033767 A  1/2002
JP  2002-271332 A  9/2002

(Continued)

OTHER PUBLICATIONS

Rosen, E., et al., "Multiprotocol Label Switching Architecture", Network Working Group, Jan. 2001; IETF RFC 3031, [online], [searched on Nov. 7, 2005], internet <URL: http://www.ietf.org/rfc/rfc3031.txt>.

(Continued)

*Primary Examiner* — Kevin C Harper
*Assistant Examiner* — Samina Choudhry
(74) *Attorney, Agent, or Firm* — Harness, Dickey & Pierce, P.L.C.

(57) ABSTRACT

When a failure occurs on a path set between two packet communication devices, a protection path is set and the communication is recovered without having the effect of the path failure on devices other than the two packet communication devices. When a packet communication device detects a failure in a transmission line or a path between the device itself and a correspondent packet communication device to restore the communication, at least one of a topology modification notice pending step, in which the fact that the connection with the correspondent packet communication device being disconnected is not reported to the packet communication devices other than the correspondent packet communication device for a prescribed time, and a path restoration step, in which path setting signaling is performed to trigger cooperation of the path communication device and the correspondent packet communication device to set the protection path within the prescribed time, is executed together with a virtual interface setting modification step in which a virtual interface used for the path disconnected by the failure is set to the protection path.

9 Claims, 7 Drawing Sheets

U.S. PATENT DOCUMENTS

| | | | |
|---|---|---|---|
| 6,898,630 B2 * | 5/2005 | Ueno et al. | 709/223 |
| 7,333,424 B2 * | 2/2008 | Yamanaka et al. | 370/217 |
| 7,447,149 B1 * | 11/2008 | Beesley et al. | 370/217 |
| 2002/0010770 A1 | 1/2002 | Ueno et al. | |
| 2003/0007451 A1 | 1/2003 | Ochiai et al. | |
| 2003/0145246 A1 | 7/2003 | Suemura | |
| 2004/0109687 A1 | 6/2004 | Park et al. | |
| 2004/0252635 A1 | 12/2004 | Kasper | |
| 2005/0141444 A1 * | 6/2005 | Hirai | 370/313 |
| 2005/0163123 A1 * | 7/2005 | Gangadharan | 370/392 |
| 2005/0237927 A1 * | 10/2005 | Kano et al. | 370/216 |
| 2006/0171303 A1 * | 8/2006 | Kashyap | 370/228 |
| 2006/0227758 A1 * | 10/2006 | Rana et al. | 370/351 |

FOREIGN PATENT DOCUMENTS

| | | | |
|---|---|---|---|
| JP | 2003-018199 A | 1/2003 | |
| JP | 2003-258904 | 9/2003 | |
| JP | 2003-258906 | 9/2003 | |
| JP | 2003-318983 A | 11/2003 | |
| JP | 2005-244405 A | 9/2005 | |
| WO | WO-2004/032420 A2 | 4/2004 | |
| WO | WO-2004/102903 A1 | 11/2004 | |
| WO | WO-2006/025296 A1 | 3/2006 | |

OTHER PUBLICATIONS

Berger, L., Editor, Generalized Multi-Protocol Label Switching (GMPLS) Signaling Functional Description, Network Working Group, Jan. 2003; IETF RFC 3471, [online], [searched on Nov. 7, 2005], internet <URL: http://ietf.org/rfc/rfc3471.txt>.

Tagami, Atsushi, et al., "Packet Layer Routing Stability Analysis for GMPLS-based IP Backbone," Technical Report of IEICE, NS2003-380, IN2003-335, Feb. 27, 2004, pp. 439-444, The Institute of Electronics, Information and Communication Engineers (with partial English translation).

Inoue, Ichiro, et al., "Next Generation Core Network Architecture—Multi-layer Service Network Architecture," NTT Technical Journal, Dec. 2003, pp. 52-56.

Jensen, Terje, "Planning Dependable Network for IP/MPLS Over Optics," Telektronikk 3/4.2003, 2003, pp. 128-162, retrieved from the Internet: URL: http://www.telenor.com/telektronikk/volumes/pdf/3_4.2003/Page_128-162.pdf [retrieved on Jun. 21, 2010], Norway.

* cited by examiner

FIG. 5

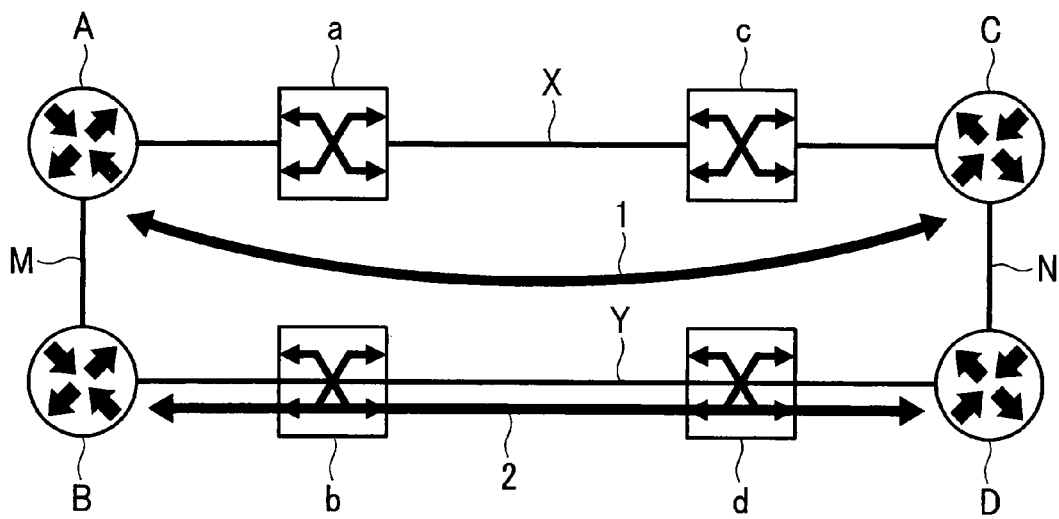

FIG. 6

| DESTINATION | OUTPUT DIRECTION | |
|---|---|---|
| PACKET COMMUNICATION DEVICE A | TRANSMISSION LINE M | |
| PACKET COMMUNICATION DEVICE C | PATH Y | ← RELATED TO TRAFFIC FLOW 1 |
| PACKET COMMUNICATION DEVICE D | PATH Y | ← RELATED TO TRAFFIC FLOW 2 |
| ... | ... | |
| ... | ... | |

FIG. 7

| DESTINATION | OUTPUT DIRECTION | |
|---|---|---|
| PACKET COMMUNICATION DEVICE A | TRANSMISSION LINE M | |
| PACKET COMMUNICATION DEVICE C | TRANSMISSION LINE M | ← RELATED TO TRAFFIC FLOW 1 |
| PACKET COMMUNICATION DEVICE D | TRANSMISSION LINE M | ← RELATED TO TRAFFIC FLOW 2 |
| ... | ... | |
| ... | ... | |

METHOD FOR RELIEVING FAILURE, AND PACKET COMMUNICATION DEVICE

TECHNICAL FIELD

The present invention relates to a technique for restoring a path by cooperation between path networks of different layers after the occurrence of a failure.

Priority is claimed on Japanese Patent Application No. 2005-350602, filed Dec. 5, 2005, the content of which is incorporated herein by reference.

BACKGROUND ART

In recent years, path networks have occupied the attention of the industry as networks which accommodate traffics of large-capacity efficiently, and the research and development task of developing a path control signaling protocol for setting or deleting paths has been pushed forward. For example, Multi-Protocol Label Switching (MPLS) was researched and developed initiatively by the Internet Engineering Task Force (IETF), and was standardized as IETF RFC (Request for Comments) 3031 (see non-patent document 1), and then implementation thereof to a router and a Layer ⅔ switch has begun. Also, Generalized Multi-Protocol Label Switching (GMPLS) was researched and developed initiatively by the IETF, and was standardized as IETF RFC 3471 (see non-patent document 2), and then implementation thereof to a router, a Layer ⅔ switch, an Optical Cross Connect (OXC), and a Synchronous Optical Network and Synchronous Digital Hierarchy (SONET/SDH) device has begun.

Further, new path control signaling protocols named Optical User Network Interface (OUNI) and GMPLS-UNI (User Network Interface) were developed, and the research and development of GMPLS proceeded so that setting and deleting paths among path networks with different layers became possible. For example, due to the development of the above-described path control signaling protocols, setting or deletion of a path in a packet-based path network from another packet-based path network composed of routers or Layer ⅔ switches via a wavelength-based path network composed of OXCs became possible.

Nowadays, new restoration technology has been investigated. According to the technology, under a condition such that routers are path-connected via an OXC network, a router resets a path responding to a failure occurred in the OXC network or occurred between the router and an OXC.

Non-Patent Document 1: IETF RFC 3031, [online], [searched on Nov. 7, 2005], internet <URL: ttp://www.ietf.org/rfc/rfc3031.txt>

Non-Patent Document 2: IETF RFC 3471, [online], [searched on Nov. 7, 2005], internet <URL: http://www.ietf.org/rfc/rfc3471.txt>

DISCLOSURE OF INVENTION

Problems to be Solved by the Invention

Although packet communication devices such as routers detect failures in a path, and set a path for backup, such devices start a connection relationship modification process immediately as the failures are detected. The packet communication device informs an adjacent packet communication device of the modification of a connection relationship, and the packet communication device informed informs the further adjacent packet communication devices, in turn, of the modification of the connection relationship. Consequently, the modification of the connection relationship has an influence on the whole network. Since the packet communication devices perform the connection relationship modification process, the load of the process on the packet communication devices rises, thereby deteriorating the packet transfer performance of the packet communication devices.

The present invention has been achieved in such a background, and an object of the invention is to provide a method for relieving a failure and a packet communication device which lets the communication restore when a failure occurs in the path established between the two packet communication devices without having the effect of the path failure on devices other than the two packet communication devices by setting a protection path (or a substitute path).

Means for Solving the Problems

A method for relieving failure according to the first aspect of the present invention is a method for relieving failure in a packet communication system, which comprises packet communication devices communicating mutually by using packets, and path communication devices which are provided on a transmission line between the packet communication devices and which set or release a path on the transmission line between the packet communication devices, when a packet communication device detects a failure on the transmission line or the path between itself and a correspondent packet communication device to restore the communication, the method comprising: a path restoration step in which path setting signaling is performed to trigger cooperation of the path communication device and the correspondent packet communication device to set a protection path within a prescribed time; and a virtual interface setting modification step in which a virtual interface which has been used for the path disconnected by the failure is set to the protection path.

The method for relieving failure according to the first aspect of the present invention may comprise a topology modification notice pending step in which the fact that the connection with the correspondent packet communication device being disconnected is not reported to the packet communication devices other than the correspondent packet communication device for the prescribed time.

In the topology modification notice pending step, the packet communication device, whose connection with the correspondent packet communication device is disconnected, may maintain the connection with the correspondent packet communication device.

In the path restoration step, a location where the failure occurred is identified when the failure occurs on the transmission line or the path between the packet communication device and the path communication device, and the protection path may be set in a section between the packet communication device and the path communication device which covers the location of the failure.

A method for relieving failure according to the second aspect of the present invention is a method for relieving failure in a packet communication system, which comprises packet communication devices communicating mutually by using packets, and path communication devices which are provided on a transmission line between the packet communication devices and which set or release a path on the transmission line between the packet communication devices, when a packet communication device detects a failure on the transmission line or the path between itself and a correspondent packet communication device to restore the communication, the method comprising: a topology modification notice pending step in which the fact that the connection with the correspondent packet communication device being disconnected is not reported to the packet communication devices other than the correspondent packet communication device for a prescribed time; and a virtual interface setting modification step in which a virtual interface which has been used for the path disconnected by the failure is set to a protection path.

The method for relieving failure according to the second aspect of the present invention may comprise a path restoration step in which a location where the failure occurred is identified when the failure occurs on the transmission line or the path between the packet communication device and the path communication device, and the protection path is set in a section between the packet communication device and the path communication device which covers the location of the occurrence of the failure by performing path setting signaling to trigger cooperation of the path communication device and the correspondent packet communication device within the prescribed time.

The method for relieving failure according to the first and the second aspect of the present invention may comprise a step in which a packet communication device located at the end of the path on which the failure occurred transfers the traffic, which has been flowing in the path on which the failure occurred, to another existing path or another transmission line until the path restoration step and the virtual interface setting modification step are completed.

The method for relieving failure according to the first and the second aspect of the present invention may further comprise: a step in which the path on which the failure occurred is deleted before or after the protection path is set.

A packet communication device of the present invention is a packet communication device adopted in a packet communication system, which comprises packet communication devices communicating mutually by using packets, and path communication devices which are provided on a transmission line between the packet communication devices and which set or release a path on the transmission line between the packet communication devices, and the packet communication device is provided with a device which executes the steps in the method for relieving failure of the present invention.

A program according to the present invention is a program which realizes functions corresponding to the packet communication device of the present invention on a general purpose information processing device by being installed on the information processing device.

A recording medium according to the present invention is a recording medium on which the program of the present invention is recorded, and which is readable by the information processing device.

Effects of Invention

According to the present invention, when a failure occurs on a path set between the two packet communication devices, a protection path will be set and the communication can be recovered without having the effect of the path failure on devices other than the two packet communication devices.

BRIEF DESCRIPTION OF THE DRAWINGS

FIG. 5 is a diagram showing a network configuration for explaining the second embodiment.

FIG. 6 is an illustration of a connection relationship held by a packet communication device B shown in FIG. 5.

FIG. 7 is an illustration of a connection relationship held by the packet communication device B shown in FIG. 5 after the connection relationship was modified due to the failure in the path.

DESCRIPTION OF REFERENCE SYMBOLS 1 and 2: traffic flows; 1-1, 1-2, A, B, C and D: packet communication devices; 2-1, 2-2, a, b, c and d: path communication devices; 10: path control unit; 11: packet transfer unit; 12, α and β: virtual interfaces; 20: lower layer path control unit; 21: lower layer transfer unit; 30, M, N, and P to W: transmission lines; PP: protection path; WP: working path; 40, X and Y: paths

BEST MODE FOR CARRYING OUT THE INVENTION

The embodiments and examples of the present invention will be explained below in detail with reference to the accompanying drawings. However, the embodiments and examples are just exemplification of the present invention, and the present invention is not limited to these embodiments and examples. Therefore, additions, omissions, and substitutions of components and other modifications can be made without departing from the scope of the present invention. Moreover, for example, suitable combinations of these embodiments and/or examples are also within the scope of the present invention.

A first characteristic of the embodiments and examples of the present invention is that after a packet communication device detects a failure in a path or transmission line, modification of the connection relationship is not reported to packet communication devices other than the correspondent packet communication device of the connected path.

A second characteristic of the embodiments and examples of the present invention is that Internet Protocol (IP) address information and Media Access Control (MAC) address information which have been given to the endpoint node of the path where a failure occurred are given to a protection path to establish the protection path, thereby making the network state after the failure is relieved the same as the network state before the failure occurs, so that the packet communication device does not need to inform the other packet communication devices of the modification of the connection relationship.

[First Embodiment]

Figure 1:
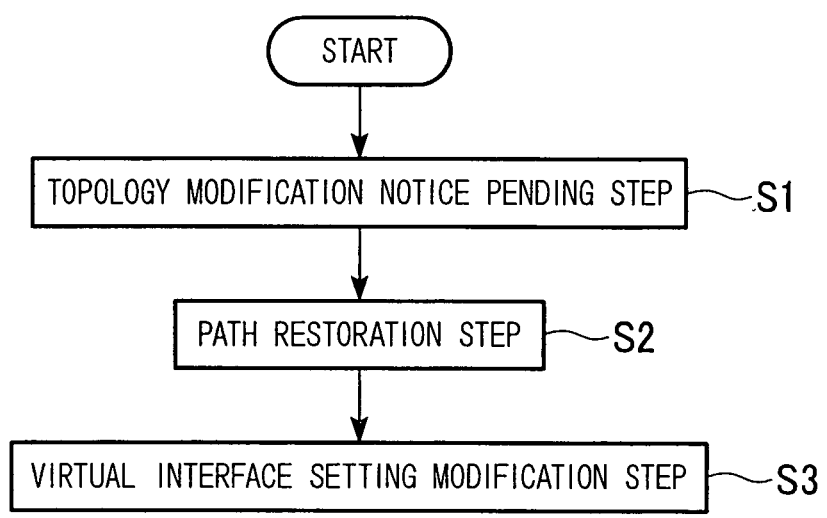
FIG. 1 is a flowchart for relieving failure according to the first embodiment indicating the principle of the present invention.
Figure 2:
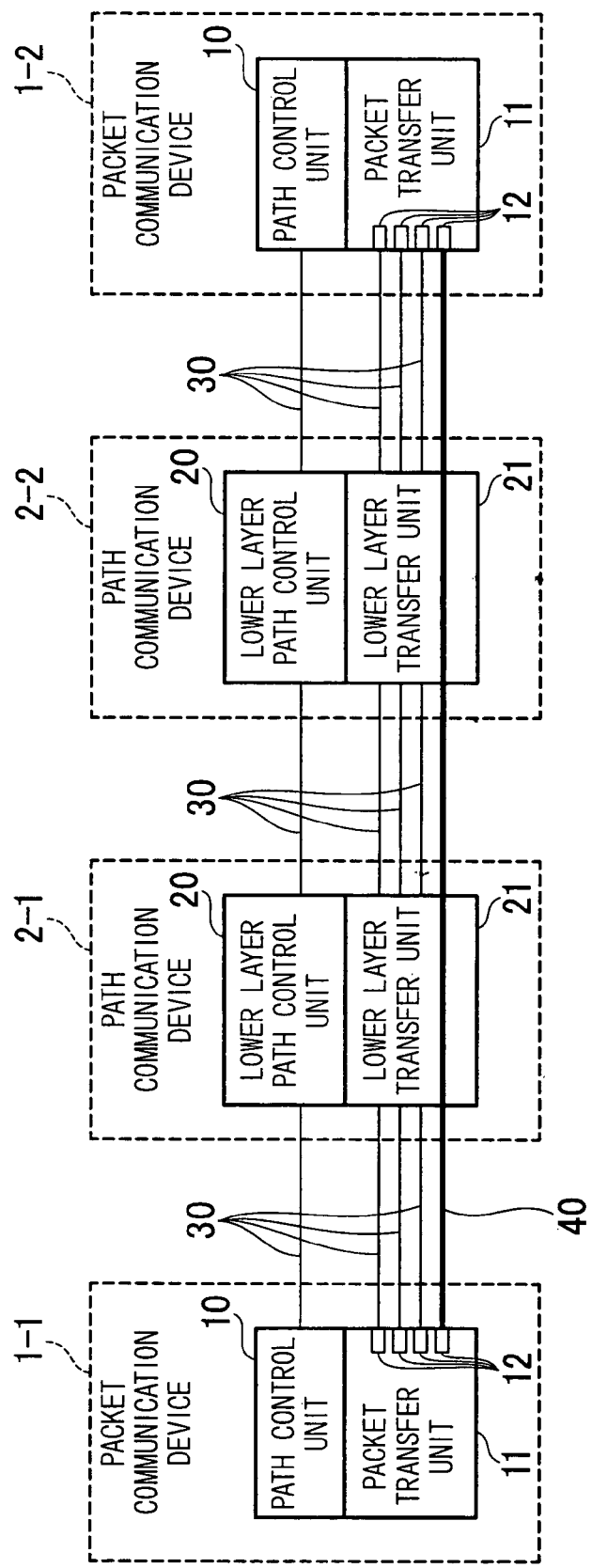
FIG. 2 is an illustration of a network configuration for explaining the first embodiment.

FIG. 1 is a flowchart showing a flow of relieving a failure according to the present embodiment for explaining the principle of the present invention. FIG. 2 is an illustration of a network configuration for explaining the present embodiment. For example, packet communication devices 1-1 and 1-2 comprise a packet transfer unit 11 and a path control unit 10. The packet transfer unit 11 is provided with a virtual interface 12, which is provided with one or more of pieces of information, for example, a MAC address, an interface index (IfIndex), and an IP address, and has a function to transfer a packet to transmission lines 30 and to a path 40 via the virtual interface 12 when the input packet is to be transferred to other communication devices, and a function to collect connection information of communication devices in the network to calculate and decide a packet transfer route. The path control unit 10 has a function to modify setting of the packet transfer unit 11 based on the content of a path control signaling which is performed by the path control unit 10 to set or delete a path 40 on the transmission line 30 between other path control unit(s) 10, and a function to decide a path route and a transfer route of the path control signaling.

Moreover, path communication devices 2-1 and 2-2, for example, which are lower layer path communication devices, comprise a lower layer path control unit 20 and a lower layer transfer unit 21. The lower layer path control unit 20 has a function to modify setting of the lower layer transfer unit 21 based on the content of a path control signaling which is performed by the lower layer path control unit 20 to set or delete a path on the transmission line 30 between other lower layer path control unit(s) 20, and a function to decide a path route and a transfer route of the path control signaling. The lower layer transfer unit 21 has a function to transfer packets to the path 40 and to the transmission lines 30.

Assume the following state that in the network configuration provided with the above-described packet communication devices 1-1 and 1-2 and the path communication devices 2-1 and 2-2, the path control unit 10 and the lower layer path control unit 20, for example, are connected by a transmission line 30; the packet transfer unit 11 and the lower layer transfer unit 21 are connected by transmission lines 30; the packet communication device 1-1, for example, is connected by the path 40 with another packet communication device 1-2 via a path communication network composed with the path communication devices 2-1 and 2-2; and the path control signalings of the path control unit 10 and the lower layer path control unit 20 cooperate to set or delete paths between the packet transfer unit 11 and the lower layer transfer unit 21.

It is noted that, in FIG. 1, the order of steps S1 to S3 may be changed. In the packet communication devices 1-1 and 1-2 shown in FIG. 2, the path control unit 10 and the packet transfer unit 11 may be integrated. Similarly, in the path communication devices 2-1 and 2-2, the lower layer path control unit 20 and the lower layer transfer unit 21 may be integrated.

Figure 3:
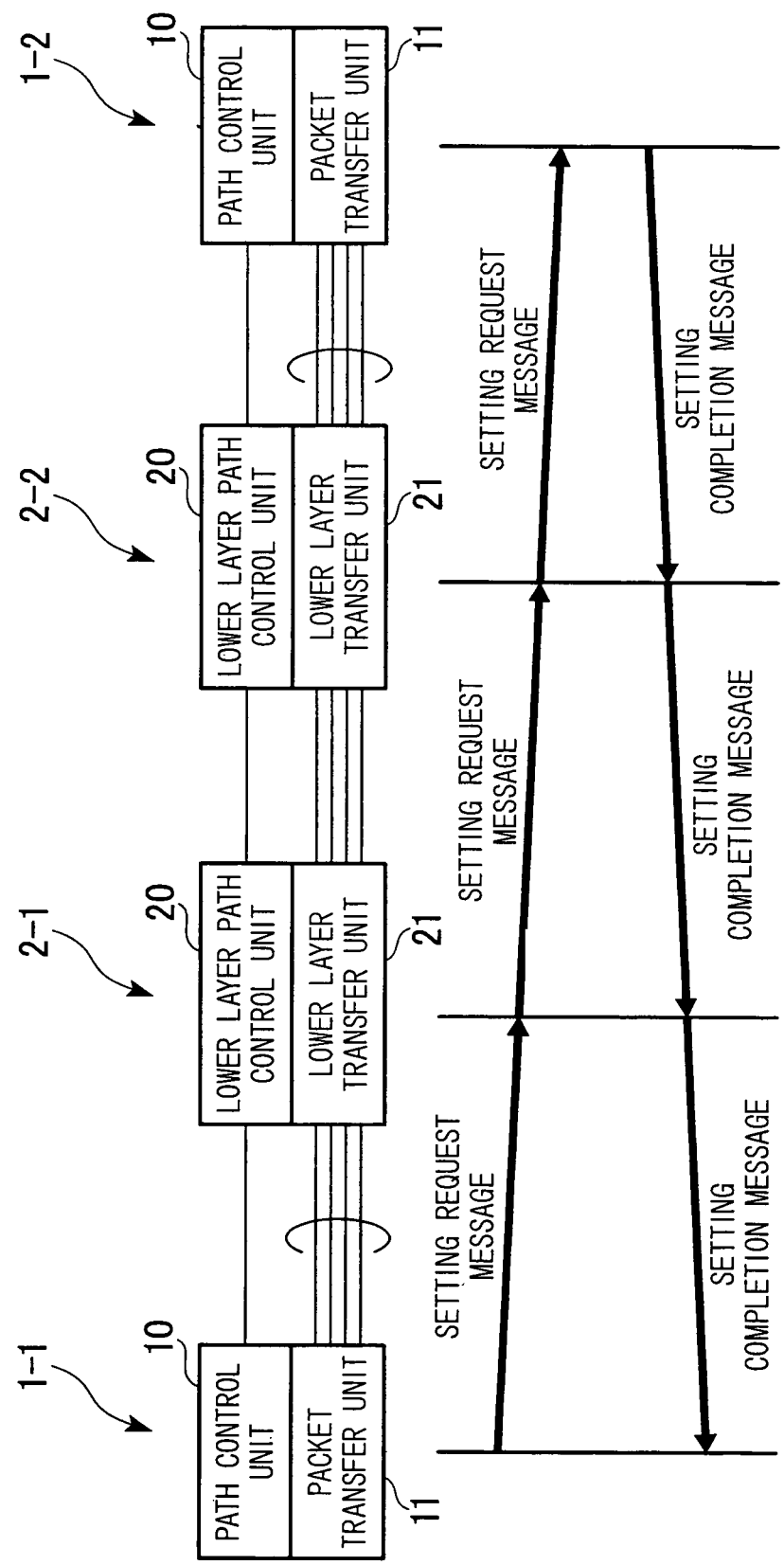
FIG. 3 is an illustration of a signaling sequence for setting a path.
Figure 4:
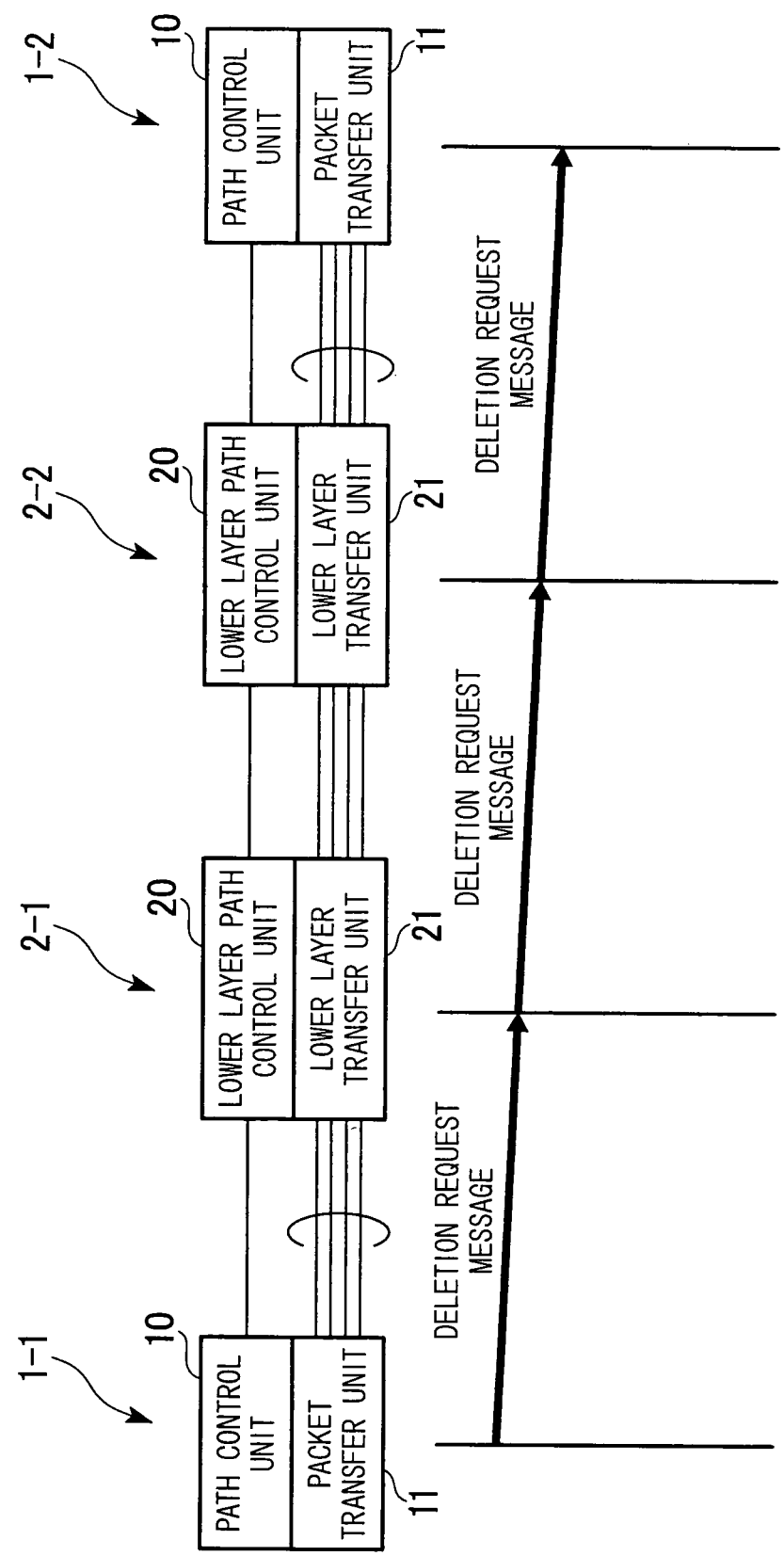
FIG. 4 is an illustration of a signaling sequence for deleting a path.

As a method for setting or deleting the path 40 by cooperation of the path control unit 10 and the lower layer path control unit 20, there exists GMPLS signaling. FIG. 3 is an example of GMPLS signaling for setting the path 40 between the packet communication devices 1-1 and 1-2 in the network configuration shown in FIG. 2. In a setting request message, information on how to control the lower layer transfer unit 21 and the packet transfer unit 11 at the time of the path 40 being set is stated. In a setting completion message, information on how the lower layer transfer unit 21 and the packet transfer unit 11 were controlled in order to set the path is stated. In the present invention, path setting methods other than the GMPLS signaling shown in FIG. 3 may be used. FIG. 4 is an example of GMPLS signaling for deleting an existing path which has been set between the packet transfer devices 1-1 and 1-2 in the network configuration shown in FIG. 2. In a deletion request message, information on how to control the lower layer transfer unit 21 and the packet transfer unit 11 when the path is deleted is stated. In the present invention, path deletion methods other than the GMPLS signaling shown in FIG. 4 may be used.

The packet communication devices 1-1 and 1-2 according to the present embodiment exchange information by sending and receiving messages in order to know the connection relationship with the neighboring packet communication devices 1-2 and 1-1. Information exchange is carried out not only regularly but also occasionally when the connection relationship is modified. As the content of a sent message, information on transmission lines connected to the packet communication device which sent the message, IP address information, MAC address information, IfIndex information, information which is a combination of these, and the like are stated. The packet communication device which received the message can obtain the IP address, MAC address, IFIndex, and the like held by the packet communication device adjacent to the packet communication device.

When a transmission line or the like is disconnected, the packet communication devices 1-1 and 1-2 connected by the disconnected transmission line cannot exchange information for a certain period of time, and both of the packet communication devices 1-1 and 1-2 know that they are not in the adjacent relationship.

The virtual interface 12 is provided with an IP address, a MAC address, and the like, and with information indicating connection relationship. It is assumed that two packet communication devices connected by a path named "A" set a path named "B" when the path "A" goes wrong. In this case, since the connection relationship has been modified, the two packet communication devices 1-1 and 1-2 exchange information regarding connection relationship modification with the neighboring packet communication devices 1-2 and 1-1. However, if the virtual interface 12 which has been given to the path "A" is given to the path "B", the path "B" is recognized as the same as the path "A" within the network, so that modification is not caused in the connection relationship. As the virtual interface 12, there are RFC2784GRE (Generic Routing Encapsulation) standardized by IETF, and IEEE802.3ad standardized by IEEE (Institute of Electrical and Electronics Engineers). The virtual interface according to the present invention includes physical interfaces in addition to those standardized virtual interfaces.

When the traffic in the packet transfer unit 11 is transferred to other packet communication devices, the packet communication device accommodates the traffic in the path 40 via the virtual interface 12, and then transfers it to the correspondent packet communication device. The correspondent packet communication device receives the traffic from the path 40 via the virtual interface 12.

There are three methods for the packet communication device to detect a failure in a path. The first case of path failure detection is that when an error message is reported to the packet transfer unit 11 connected to the failure-occurred path, or when signals of any sort do not arrive. There are two types of error messages. In a first type of error message, there is description about where in the path the failure occurred. A second type of error message only notifies the occurrence of a failure. The second method of path failure detection is that information exchange regarding the connection relationship between the packet transfer unit 11 and the lower layer transfer unit 21, or between the path control unit 10 and the lower layer path control unit 20, which have been connected by the path on which a failure occurred, is stopped. The third method of path failure detection is such that an error message is reported to the path control unit 10 provided on the path in which a failure occurred. In the error message, there is description mainly about where and what kind of failure has occurred.

Figure 8:
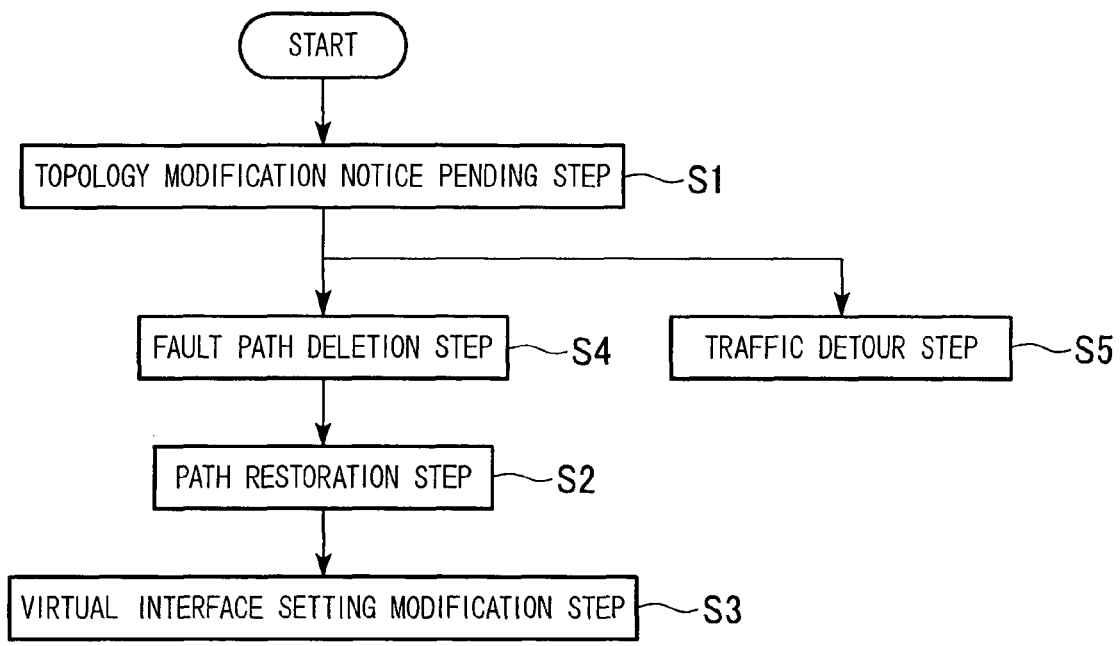
FIG. 8 is a diagram for explaining Example 1.

The packet communication device according to the present embodiment sets a pending time for notification of topology modification after detecting the failure in the path 40 until it starts the modification process of the connection relationship with other packet communication devices (step S1 in FIGS. 1 and 8). The packet communication device sets a protection path while in the pending time for notification of topology modification (step S2 in FIGS. 1 and 8), and sets the virtual interface 12 which has been provided to the path on which the failure occurred to the protection path (step S3 in FIGS. 1 and 8).

There are three methods for a packet communication device to set a protection path: a case in which a protection path is set based on a predefined route; a case in which a protection path is set by identifying the location of failure first, and then the route of the protection path is determined in order to avoid the failure; and a case in which a protection path is set by determining the route of the protection path randomly. Although the signaling technique shown principally in FIG. 3 is used for the method for setting the protection path, other methods may be used.

After setting the protection path, the packet communication device allocates the virtual interface 12, which has been provided to the path on which the failure occurred, to the protection path. At this time, the virtual interface 12 may either be released from or allocated still to the path on which the failure occurred. That is, since two or more physical interfaces can be associated with one virtual interface, the protection path alone in place of the failure-occurred path may be associated with the virtual interface 12, or both of the failure-occurred path and the protection path may be associated with the virtual interface 12.

Accordingly, two packet communication devices connected by the path on which the failure occurred can recover the connection relationship without changing the connection relationship.

[Second Embodiment]

In the present second embodiment, until the path restoration step (S2) and the virtual interface setting modification step (S3) are completed, the packet communication device, which is the endpoint node of the path on which a failure occurred, executes a step in which the traffic having flowed in the failure-occurred path is transferred to other existing paths or transmission lines.

When a failure occurs in the path connected to the packet communication device according to the first embodiment, it does not inform packet communication devices other than the correspondent packet communication device of the modification of connection relationship during the pending time for notification of topology modification. Consequently, other packet communication devices determine that no failure has occurred in the network and might transfer traffic toward the path on which the failure occurred.

FIG. 5 is a block diagram of a network for explaining the present embodiment. In FIG. 5, a traffic flow 1 flows between a packet communication device A and a packet communication device C. Similarly, a traffic flow 2 flows between a packet communication device B and a packet communication device D. Moreover, a path X is set between the packet communication devices A and C, and a path Y is set between the packet communication devices B and D. The traffic flows 1 and 2 flow in the path Y. The packet communication devices A and B are connected by a transmission line M, and the packet communication devices C and D are connected by a transmission line N.

FIG. 6 shows an example of connection relationships with other packet communication devices held by the packet communication device B. In the connection relationships shown in FIG. 6, it is described that from which portion of the packet communication device B the traffic should be output for every destination. In FIG. 6, the output direction of the traffic flows 1 and 2 is set to the path Y. When a failure occurs on the path Y in the present embodiment, the packet communication devices B and D update the connection relationship with other packet communication devices so that the traffic flow 2 flows in the path X after detecting the failure in the path Y (step S5 shown in FIG. 8).

FIG. 7 shows an example of updated connection relationships of the packet communication device B. In FIG. 7, the output directions of the traffic flows 1 and 2 were modified so that they flow through the transmission line M. Accordingly, the traffic flow 2 is immediately transferred via the other detour path (path X) after the failure of the path Y, thereby reducing the amount to be discarded of the traffic flow 2. On the other hand, while in the pending time for notification of topology modification, the packet communication devices A and C cannot detect the occurrence of modification in the connection relationships with other packet communication devices, so that the packet communication devices A and C will transfer the traffic flow 1 toward the packet communication devices B and D.

However, according to the present embodiment, the packet communication devices B and D even transfer the traffic flow 1 such that the traffic flow 1 flows through the other detour path (path X), thereby reducing the amount of the traffic flow 1 to be discarded. There is quite a possibility that the traffic flows 1 and 2 flow on the protection path for the path Y after the protection path for the path Y is established.

[Third Embodiment]

In the present embodiment, before or after a protection path is set, a step to delete a path on which a failure occurred is executed.

Although the signaling technique shown principally in FIG. 4 is used for the method for deleting a failure-occurred path, other deletion methods may be used. By deleting the path on which the failure occurred (step S4 in FIG. 8), network resources such as transmission lines in which the failure-occurred path was passing can be released. Consequently, such released network resources can be used to set other paths.

EXAMPLES

Example 1

Each of the following examples is an example of the above-described first, second, and third embodiments respectively. A flow of the relieving failure of the present example is shown in FIG. 8. An IP router is used as the packet communication device. However, in the present example, L2 switches or Layer ⅔ switches may be used instead of the IP routers. An optical cross-connect device (OXC) is used as the path communication device. However, in the present example, SONET/SDH communication device may be used instead of the OXC.

The IP router employs OSPF (Open Shortest Path First) for the technique to know the connection relationship with the other IP routers. The OSPF exchanges connection information every 10 seconds as its initial setting, and determines that the connection relationship has been modified when the exchange of connection information stops for 40 seconds. However, in the present example, Border Gateway Protocol (BGP), Routing Information Protocol (RIP) or the like may be employed instead of the OSPF.

It is assumed that the pending time for notification of topology modification, that is, the time from the occurrence of a failure in the path until the packet communication device starts notifying other packet communication devices of a modification to its connection relationships, is set to 500 msec. The IP router and the OXC use GMPLS signaling as the signaling technique. However, in the present example, path setting techniques and path deleting techniques other than the GMPLS signaling may be used. As the virtual interface, IEEE802.3ad technique is used. However, GRE may be used instead of the IEEE802.3ad in the present example.

Figure 9:
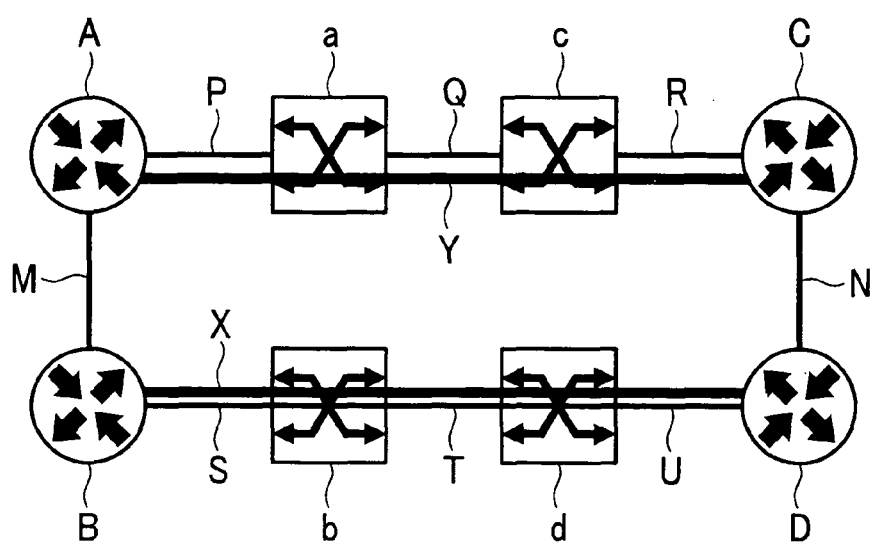
FIG. 9 is a network block diagram for explaining Example 1.

The network configuration of the present example is shown in FIG. 9. There exists a plurality of packet communication devices A, B, C, and D, and path communication devices a, b, c, and d. Each communication device is connected by transmission lines M, N, and P to U as shown in FIG. 9. A path X is set between the packet communication devices B and D. It is assumed that the path X was set from the packet communication device B towards the packet communication device D.

It is assumed that a failure has occurred on the path X between the path communication devices b and d. An error message is sent from the path communication device b directed toward the path control unit 10 and the packet transfer unit 11 of the packet communication device B, and the packet communication device B receives the above-described error message.

The packet communication device B which received the error message detects that a failure has occurred in the path X, and then starts searching for a detour route to set as the protection path. The packet communication device B searches for the detour route based on the connection relationship information held within the device and the information in the error message.

The packet communication devices B and D do not inform the packet communication devices A and C of the occurrence of modification in connection relationship during the 500 msec of the pending time for notification of topology modification (step S1).

The packet communication devices B and D transfer the traffic which might flow in the path X to the packet communication devices A or C during the 500 msec of the pending time for notification of topology modification (step S5). However, the traffic may not necessarily be transferred. Although, when the traffic is not transferred, the traffic which flowed in the path X is discarded.

The packet communication device B deletes the path X (step S4). However, the path X may not necessarily be deleted. Although, if the path X is not deleted, the network resources such as the transmission lines used for the path X cannot be used for the protection path.

It is assumed that the detour route passes the packet communication device B, the path communication device b, the path communication device a, the path communication device c, the path communication device d, and the packet communication device D (in this order). At this time, the packet communication device B performs signaling along the above-described detour route and sets a protection path Y (step S2).

The packet communication devices B and D assign the virtual interface which has been used for the path X to the path Y (step S3).

By establishing the path Y within the pending time for notification of topology modification, the OSPF operating in each packet communication device determines that no modification has occurred in the network configuration. Accordingly, the packet communication devices B and D do not need to inform the packet communication devices A and C of the modification of its connection relationships, so that the load of the connection relationship modification process can be reduced.

Example 2

Figure 10:
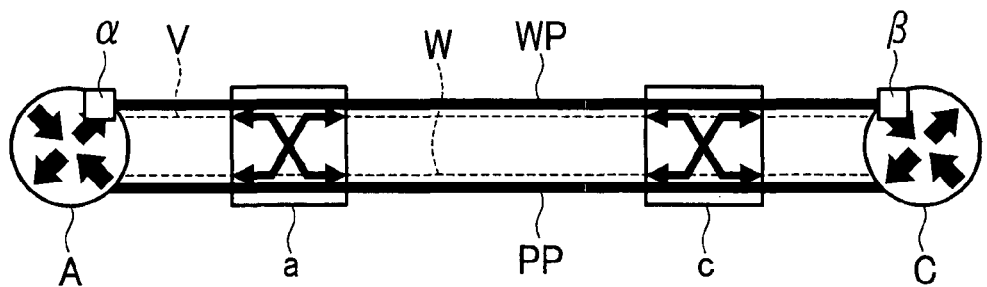
FIG. 10 is a network block diagram for explaining Examples 2 and 3.

A network configuration of the present example is shown in FIG. 10. Although the network configuration is basically the same as that in FIG. 9, since the packet communication devices B and D, and the path communication devices b and d do not have direct connection with the present example, those are omitted from FIG. 10. Moreover, in the present example, transmission lines V and W are provided between the packet communication devices A and C, and a working path WP and a protection path PP are set between those packet communication devices. In regard to the elements such as what kind of devices are used as the packet communication devices and the path communication devices, which technique is used to know the connection relationship, which technique is used as the signaling technique, and what kind of the virtual interface is used, the same elements are used in the present example as those in Example 1.

A flow of relieving failure of the present example is such that the path restoration step S2 is excluded from the steps S1 to S3 shown in FIG. 1, and is formed by the topology modification notice pending step S1 and the virtual interface setting modification step S3.

As shown in FIG. 10, the packet communication devices A and C are executing packet communication via the working path WP. Although the working path WP and the protection path PP have been preset, the protection path PP has been set so as not to be able to transfer IP packets. For example, settings of the protection path PP have been nullified, or the IP routing function has been set not to operate on the protection path PP.

In the network shown in FIG. 10, an IP routing table (not shown) of the packet communication device A is as follows;
Destination
packet communication device C
Via
virtual interface α
virtual interface β
Furthermore, the IP routing table (not shown) of the packet communication device C is as follows;
Destination
packet communication device A
Via
virtual interface β
virtual interface α

Figure 11:
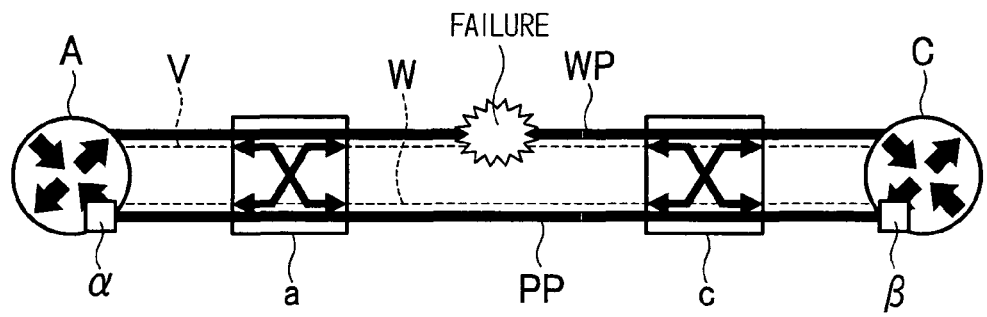
FIG. 11 is a diagram explaining the operation of Example 2 when a failure occurs in the network shown in FIG. 10.

FIG. 11 shows a case in which a failure occurred on the working path WP in the network shown in FIG. 10. The packet communication devices A and C relocate the virtual interfaces α and β, which have been assigned to the working path WP, to the protection path PP (step S3). Moreover, the packet communication devices A and C follow the topology modification notice pending step (step S1) and during the pending time for notification of topology modification (for example, 500 msec similar to Example 1), the packet communication devices A and C do not inform packet devices other than the packet communication devices A and C that the topology has been modified due to failure on the working path WP. Furthermore, the packet communication devices A and C follow the topology modification notice pending step, so as not to modify the IP routing tables of their own during the pending time for notification of topology modification. Accordingly, the packet communication devices A and C, in the event of a failure on the working path WP, can recover the communication to the former condition by using the protection path PP without modifying the IP routing tables. Since the IP routing tables are not modified, the recovery time in the event of a failure can be shortened.

Example 3

The present example deals with, from among the methods described above as the methods for setting the protection paths, the case in which determination and setting of the route of the protection path are carried out so as to avoid a failure. The network configuration of the present example is the same as that of Example 2 and is shown in FIG. 10. In regard to the elements such as what kind of devices are used as the packet communication devices and the path communication devices, which technique is used to know the connection relationship, which technique is used as the signaling technique, and what kind of the virtual interface is used, the same elements are used in the present example as those in Examples 1 and 2. Moreover, the outline of a flow for relieving failure according to the present example is the same as the one shown in FIG. 1.

In the same manner as Example 2, the packet communication devices A and C are executing packet communication via the working path WP. Also, in the same manner as Example 2, although the working path WP and the protection path PP have been preset, the protection path PP has been set so as not to be able to transfer IP packets.

Figure 12:
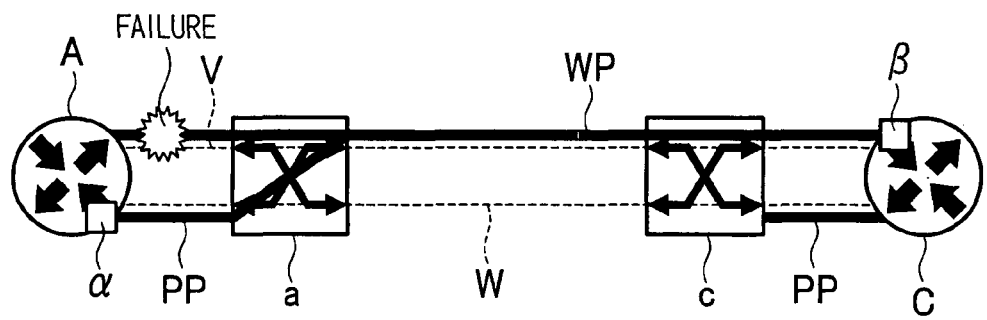
FIG. 12 is a diagram explaining the operation of Example 3 when a failure occurs in the network shown in FIG. 10.

FIG. 12 shows a case in which a failure occurred in the working path WP in the network shown in FIG. 10. Upon detecting the occurrence of a failure between itself and the path communication device A, the packet communication device A relocates the virtual interface α, which has been assigned to the working path WP, to the protection path PP (step S3). Moreover, the packet communication devices A and C follow the topology modification notice pending step (step S1) and during the pending time for notification of the topology modification (for example, 500 msec similar to Example 1), the packet communication devices A and C do not inform packet devices other than the packet communication devices A and C that the topology has been modified due to the failure in the working path WP. Furthermore, the packet communication devices A and C follow the topology modification notice pending step, so as not to modify the IP routing tables of their own (not shown) during the pending time for notification of topology modification. The packet communication device A and the path communication device A set the protection path PP by performing path setting signaling (step S2). Accordingly, the failure in a section between the packet communication devices A and C can be recovered without modifying the IP routing. Still further, by switching only for the fault section (i.e., the section between the packet communication device A and the path communication device a) from the working path WP to the protection path PP, the network resources can be utilized effectively.

Moreover, each embodiment and each example of the present invention can be realized by being installed on general purpose information processing devices, as a program which realizes functions corresponding to the functions of the packet transfer devices in each embodiment and each example on such information processing devices. This program may be recorded on a recording medium and then be installed to the information processing devices, or may be installed to the information processing devices via a communication circuit, thereby enabling the realization of functions corresponding to the packet communication devices on the information processing devices.

INDUSTRIAL APPLICABILITY

According to the present invention, when there is a failure in a path set between two packet communication devices, the communication can be recovered by setting a protection path without having the effect of the path failure on devices other than the two packet communication devices, so that the network resources can be utilized effectively.

The invention claimed is:

1. A method for relieving failure in a packet communication system, which comprises packet communication devices communicating mutually by using packets, each packet communication device comprising a packet transfer unit which transfers the packets and a path control unit which controls the packet transfer unit, and path communication devices which are provided on a transmission line between the packet communication devices, each path communication device comprising a lower layer transfer unit which transfers the packets and a lower layer path control unit which controls the lower layer transfer unit and sets or releases a path on the transmission line between the packet communication devices, when a packet communication device detects a failure on the transmission line or the path between itself and a correspondent packet communication device to restore the communication, the method comprising:

transmitting packets from the packet transfer unit to the transmission line using a routing table, where a virtual interface includes address information of Layer 3, is provided in the packet transfer unit, and specifies a path in the transmission line between the packet communication devices, and the routing table defines an interface for the packet transfer unit that is mapped to the virtual interface;

a topology modification notice pending step of not reporting the fact that connection with the correspondent packet communication device has been disconnected to the other packet communication devices other than the correspondent packet communication device for a prescribed time;

a path restoration step of, within the prescribed time, performing path setting signaling, triggering cooperation of the path communication device and the correspondent packet communication device, and setting a protection path; and a virtual interface setting modification step of, when the failure is detected, allocating a virtual interface associated with a working path to the protection path so that the other packet communication devices other than the correspondent packet communication device do not perform a modification process of a connection relationship within the prescribed time, wherein each physical interface is associated with one and only one virtual interface, and a plurality of physical interfaces are associated with a single virtual interface at the same time, and the path restoration step and the virtual interface setting modification step are performed within the prescribed time.

2. The method for relieving failure according to claim 1, wherein the topology modification notice pending step maintains, in the packet communication device, whose connection with the correspondent packet communication device is disconnected, the connection with the correspondent packet communication device.

3. The method for relieving failure according to claim 1, wherein the path restoration step identifies a location where the failure occurred when the failure occurs on the transmission line or the path between the packet communication device and the path communication device, and sets the protection path in a section between the packet communication device and the path communication device which covers the location of the failure.

4. The method for relieving failure according to claim 1, further comprising a step of transferring, by a packet communication device located at the end of the path on which the failure occurred, the traffic, which has been flowing in the path on which the failure occurred, to another existing path or another transmission line until the path restoration step and the virtual interface setting modification step are completed.

5. The method for relieving failure according to claim 1, further comprising: a step of deleting the path on which the failure occurred before or after the protection path is set.

6. A packet communication device adopted in a packet communication system, which comprises packet communication devices communicating mutually by using packets, each packet communication device comprising a packet transfer unit which transfers the packets and a path control unit which controls the packet transfer unit, and path communication devices which are provided on a transmission line between the packet communication devices, each path communication device comprising a lower layer transfer unit which transfers the packets and a lower layer path control unit which controls the lower layer transfer unit and sets or releases a path on the transmission line between the packet communication devices, when a packet communication device detects a failure on the transmission line or the path between itself and a correspondent packet communication device to restore the communication, the packet communication device comprising:

a unit which transmits packets from the packet transfer unit to the transmission line using a routing table, where a virtual interface includes address information of Layer 3, is provided in the packet transfer unit, and specifies a path in the transmission line between the packet communication devices, and the routing table defines an interface for the packet transfer unit that is mapped to the virtual interface;

a topology modification notice pending unit which does not report the fact that connection with the correspondent packet communication device has been disconnected to the other packet communication devices other than the correspondent packet communication device for a prescribed time;

a path restoration unit which, within the prescribed time, performs path setting signaling, triggers cooperation of the path communication device and the correspondent packet communication device, and sets a protection path; and a virtual interface setting modification unit which, when the failure is detected, allocates a virtual interface associated with a working path to the protection path so that the other packet communication devices other than the correspondent packet communication device do not perform a modification process of a connection relationship within the prescribed time, wherein each physical interface is associated with one and only one virtual interface, and a plurality of physical interfaces are associated with a single virtual interface at the same time, and the operation of the path restoration unit and the operation of the virtual interface setting modification unit are performed within the prescribed time.

7. A non-transitory recording medium which is readable by a general purpose information processing device and records a program, when the program is executed, the process is performed which realizes functions corresponding to the packet communication device according to claim 6 on the information processing device by being installed on the information processing device.

8. The packet communication device according to claim 6, wherein when connection between the packet communication device and the correspondent packet communication device is disconnected, the topology modification notice pending unit maintains the connection with the correspondent packet communication device.

9. The packet communication device according to claim 6, wherein the path restoration unit identifies a location where the failure occurred when the failure occurs on the transmission line or the path between the packet communication device and the path communication device, and sets the protection path in a section between the packet communication device and the path communication device which covers the location of the failure.

* * * * *

UNITED STATES PATENT AND TRADEMARK OFFICE
CERTIFICATE OF CORRECTION

| | | |
|---|---|---|
| PATENT NO. | : 8,462,617 B2 | Page 1 of 1 |
| APPLICATION NO. | : 11/665303 | |
| DATED | : June 11, 2013 | |
| INVENTOR(S) | : Yukio Tsukishima et al. | |

It is certified that error appears in the above-identified patent and that said Letters Patent is hereby corrected as shown below:

In item (86) of the title page, the PCT No. should indicate -- PCT/JP2006/318500 --.

Signed and Sealed this
Fifth Day of November, 2013

Teresa Stanek Rea
*Deputy Director of the United States Patent and Trademark Office*